April 9, 1935.  E. SCHMALHOLZ  1,996,978
SIGHTING MECHANISM FOR COMPUTING SCALES
Filed Feb. 7, 1934
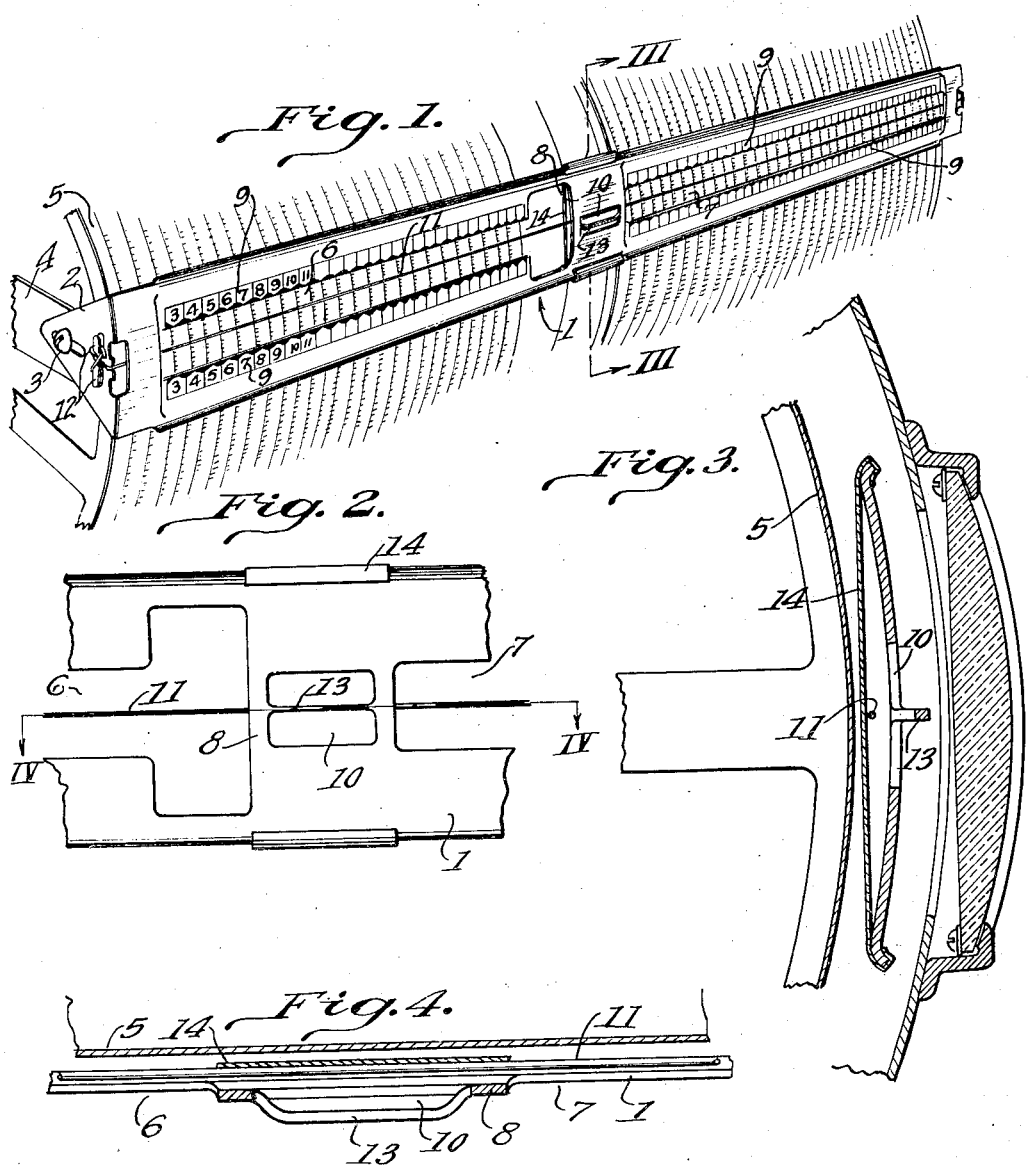
Inventor
Elmer Schmalholz Patented Apr. 9, 1935

1,996,978

UNITED STATES PATENT OFFICE 1,996,978

SIGHTING MECHANISM FOR COMPUTING SCALES

Elmer Schmalholz, Chicago, Ill., assignor to Ralston Scales Corporation, Columbus, Ohio, a corporation of Ohio Application February 7, 1934, Serial No. 710,170

5 Claims. (Cl. 116—129)

This invention relates to improvements in the reading mechanism of weighing scales of the computing type wherein a rotatable drum is provided which is movable from a normal or zero position in accordance with the weight of the objects or materials undergoing a weighing operation on such a scale. In a scale of this character, the outer surfaces of the drum are provided with price, weight and other indicia by which the merchant or scale operator, by comparing such indicia with a stationary reading line extending across the drum and viewable through the reading lens of the scale housing, may at a glance determine the weight and value of the commodity being weighed.

In order, however, that this reading may be accurate and as nearly as possible devoid of error, it is important that the operator should occupy a focal position wherein the reading line is exactly over or in front of the desired graduation on the surface of the computing drum and which should be read by the operator. To attain this result, it has been proposed to form the reading line from a thin strip of metal stationarily mounted in connection with the frame structure of the scale and disposed immediately contiguous to the outer peripheral portion of the scale drum. By the use of the strip, the operator is compelled to assume a correct focal position wherein the reading line will appear of minimum thickness or in other words so that the edge of the strip reading line only will be viewable. It has also been proposed to employ a pair of parallel reading lines consisting of transversely spaced longitudinally extending wires tautly held at their ends and arranged immediately adjacent to the drum periphery. In this latter type of construction, correct reading of the scale is obtainable when the operator occupies a focal position with respect to the scale drum that the dual reading lines appear as one, that is, the inner line will be concealed behind the outer line and will be in the focal plane of the scale observer.

While these devices provide for correct sighting and reading of a scale drum of the computing type, yet they are open to the practical objection that they retard somewhat the speed with which the scale readings may be made and are often confusing to the scale operator and as a result there is a wide demand for computing scales wherein but a single reading line is used, as has been employed since practically the introduction of the computing drum type of scale. Many State laws or other local ordinances, however, require the employment in computing scales of the double reading line or its equivalent, and, it is, therefore, an object of the present invention to provide a more universal type of scale sighting mechanism which will overcome the objections on the part of many scale users, will satisfy legal requirements of different localities, which are often quite diverse in character and at the same time to provide for the quick and accurate reading of the computing surface of a scale drum to facilitate weight and price determinations.

A further object of the invention resides in the provision of improved sighting apparatus for computing scales which is formed to comprise a price range member stationarily mounted in connection with the frame of a weighing scale in front of the computing drum, the said price range member being provided with a pair of longitudinally aligned slots through which the drum is viewable from an exterior standpoint, the slots being separated by a web disposed transversely of the price range member and wherein the web itself is formed with a sighting opening longitudinally aligned with the aforesaid slots. In connection with this structure, the present invention provides a single reading line, usually composed of a fine wire which extends longitudinally and approximately centrally of said slots and of the sighting opening in the web, there being a second reading line carried by said web and disposed centrally and longitudinally of the sighting opening to the front of and in registration with the first-named reading line, whereby, in the sighting of the scale, the operator first aligns in a focal plane the first and second named reading lines by observation through the opening in said web and then determines weight and price values by observation through the elongated slots formed in the price range member and viewing the single reading line there in view with the weight and price indicia on the computing drum.

For a further understanding of the invention, reference is to be had to the following description and the accompanying drawing, wherein:

Fig. 1 is a perspective view of the price range member of a computing drum weighing scale formed in accordance with the present invention;

Fig. 2 is a fragmentary view in front elevation of the web of the price range member disclosing the sighting opening provided therein and associated reading lines;

Fig. 3 is a transverse sectional view taken through the price range member on the line III—III of Fig. 1;

Fig. 4 is a horizontal sectional view through the price range member on the plane indicated by the line IV—IV of Fig. 2.

Referring more particularly to the drawing, the numeral 1 designates the price range member of a computing drum type weighing scale. This price range member comprises a thin elongated strip of material, usually sheet metal, having the ends 2 thereof bent inwardly and at right angles to the main plane of the price range member and adapted to be suitably and stationarily connected as at 3 with the frame structure 4 of the scale. Usually this frame structure supports for rotation a computing drum 5, which may be of any standard type wherein the outer peripheral portion thereof is provided with weight and price determining indicia. It will be understood that any suitable weighing mechanism may be employed for effecting the controlled rotation of the drum 5 in response to weight applications to the scale mechanism.

The price range member includes a pair of longitudinally extending slots 6 and 7 which in this instance are separated by a transversely disposed web 8. The upper and lower marginal edges of the slots 6 and 7 are provided, as usual, with price graduations 9 which are used, in conjunction with the indicia on the drum 5, to determine price values. Also, formed in the web 8 is a longitudinally disposed sighting opening 10, which is arranged in longitudinal alignment with the slots 6 and 7.

A reading line 11, which may be composed of a fine wire suitably colored, is connected at its ends in a taut manner with lugs 12 formed in connection with the ends 2 of the price range member. The reading line 11 is attached tightly between the ends 2 so that it will occupy a stationary position in relation to the drum 5 and will extend the full length of the price range member and its slots 6, 7 and 10 so that said reading line will be clearly viewable to the operator of the scale when a reading of the drum is to be made. The particular feature of the present invention resides in the provision of a relatively short second reading or sighting line 13 which, as shown, may be blanked and pressed from the metal strip from which the price range member is formed. The sighting line 13 is relatively spaced or elevated from the inner primary reading line 11, as shown in Figs. 3 and 4, but is arranged in the same horizontal plane as the line 11. A back plate 14 is suitably associated with the price range member and extends to the rear of the sighting opening 10 and the reading line 11, so that the latter, as well as the line 13, may be quickly and clearly viewed, since the inner surface of the plate 14 provides an appropriate background. It will be noted that the outer sighting line 13 merely extends the length substantially of the opening 10 and does not project into the slots 6 and 7 adjoining the web.

In the use of the apparatus, when a drum reading is to be taken, the scale operator stands in a position to focally register the reading and sighting lines 11 and 13 so that they appear as one. The operator's view is then transferred to one or the other of the slots 6 and 7 and price and weight determinations made by noting the position of the main reading line 11 with respect to the price and weight indicia appearing on the periphery of the scale drum or chart. By this construction, the accuracy of the double reading line is attained but with the ease and convenience of the single reading line. It will be obvious to those skilled in the art that various changes may be made in the construction herein specifically described and illustrated without departing from the spirit and scope of the invention as the latter has been defined in the following claims.

What is claimed is:

1. Sighting apparatus for computing scales comprising a price range member stationarily mounted in connection with the frame of a weighing scale in front of the computing drum thereof, said range member being provided with a pair of longitudinally aligned slots through which the drum is viewable, a transverse web separating said slots, said web being provided with a sighting opening, a single reading line extending longitudinally and approximately centrally of said slots and web opening, and a sighting line carried by said web and disposed centrally and longitudinally of the sighting opening to the front of and in registration with the first-named reading line.

2. A price range member for weighing scales of the computing drum type comprising a strip provided with longitudinally extending slots and a centrally disposed web separating said slots, said web being provided with an opening arranged in alignment with said slots, a reading line comprising a fine wire tautly secured to the ends of said price range member, the said reading line extending the full length of the price range member and substantially longitudinally and centrally of the slots therein and of the opening formed in said web, and a sighting line extending longitudinally and centrally of the length of the sighting opening and disposed for registration with and in front of said reading line only at positions between said slots.

3. In a weighing scale of the computing drum type, a reading line comprising a tautly supported wire extending substantially the full length of an associated drum, and a sighting line arranged in front of the reading line for focal registration therewith, said sighting line being disposed in registration with the central portion only of the reading line and in spaced parallel order therewith.

4. In a weighing scale of the computing drum type, a price range member comprising a longitudinally extending strip supported at its ends in front of an associated computing drum, said strip being provided with a pair of longitudinally extending slots separated by an intervening web, said web being provided with a sight opening arranged in longitudinal alignment with said slots, a reading line tautly connected with the ends of said strip and disposed centrally and longitudinally of said slots and the opening in said web, a sighting line extending parallel with the reading line and in spaced relation with respect thereto, said sighting line being limited in its length to the confines of said web, and a back plate arranged to the rear of said web and providing a background to facilitate the focal registration of the reading and sighting lines.

5. As a new article of manufacture, a price range member for weighing scales of the computing drum type, comprising a longitudinally extending strip provided with a pair of longitudinally aligned slots, said slots being spaced by an intervening web, a reading line extending the full length of said price range member and disposed longitudinally and centrally of said slots and a sighting opening provided in said web, a sighting line carried by said web and extending the length of the sighting opening therein for focal registration with said reading line, and a back ground plate arranged to the rear of the opening in said web.

ELMER SCHMALHOLZ.